United States Patent

[11] 3,619,488

[72] Inventor Donald Henry Willis
Indianapolis, Ind.
[21] Appl. No. 37,780
[22] Filed May 15, 1970
[45] Patented Nov. 9, 1971
[73] Assignee RCA Corporation

[54] VIDEO AMPLIFIERS
5 Claims, 1 Drawing Fig.

[52] U.S. Cl. .......... 178/5.4 R
[51] Int. Cl. .......... H04n 9/52
[50] Field of Search .......... 178/5.4, 5.4 MA; 330/21

[56] References Cited

UNITED STATES PATENTS 3,429,987 2/1969 Altmann .......... 178/5.4
3,506,776 4/1970 Rennick .......... 178/5.4

*Primary Examiner*—Richard Murray
*Attorney*—Eugene M. Whitacre

ABSTRACT: A video amplifier, for driving a kinescope, employs two transistors of opposite conductivity arranged in a series path and further having their emitter electrodes coupled together. The amplifier is biased stabilized by a third transistor having the collector electrode coupled to the emitter connection of the two transistors and having a capacitor coupled between the collector and base electrodes. The emitter electrode of the third transistor is returned to a source of reference potential. A unidirectional current conducting device is coupled between the base electrode of the third transistor and the collector electrode of one of the series transistors. The unidirectional device is caused to conduct a signal applied thereto and occurring during a repetitive interval, to charge the capacitor to a level determined in accordance with the quiescent voltage at the collector of said one series transistor. This level and the magnitude of said capacitor is sufficient to cause the third transistor to also conduct for the absence of said signal. This maintains the collector current of said one series transistor at the value necessary to regulate the potential at the collector electrode thereof.

A further transistor stage provides peaking, contrast control and blanking functions for the video amplifier, as described above, by operating on the luminance component of the composite signal for application thereto to the base electrode of the other one of said series transistors.

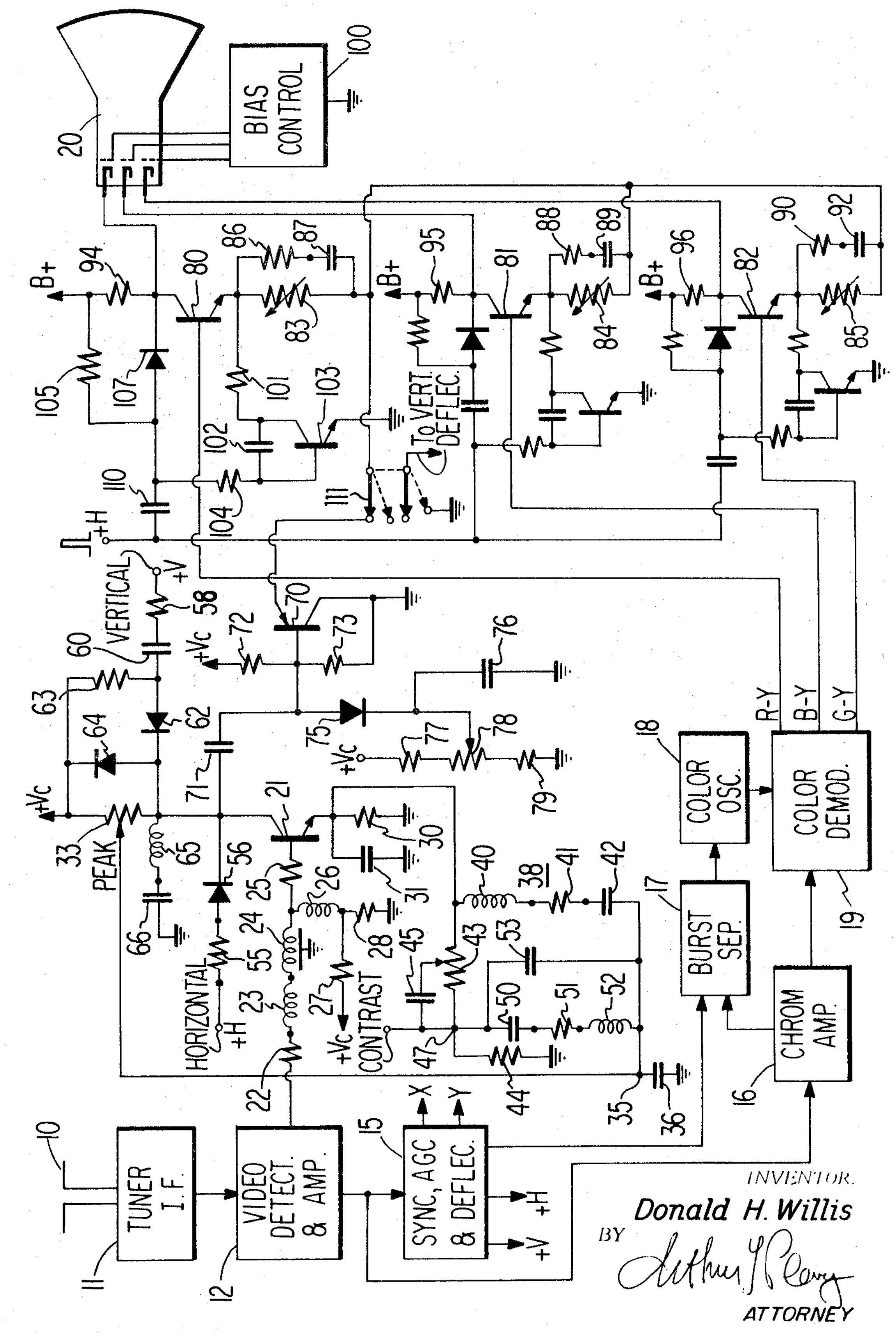
INVENTOR.
Donald H. Willis
BY
ATTORNEY

VIDEO AMPLIFIERS

This invention relates to television receivers and more particularly to video amplifier circuits for use therein.

Presently color television receivers employ a luminance channel and a chrominance channel. The luminance channel is usually direct coupled to an appropriate control electrode as the cathode of a color kinescope used in the receiver. The chrominance channel is coupled to another control electrode as the grid of this kinescope. The kinescope, in many prior art receivers, then serves to matrix the luminance signal or Y signal with the appropriate color difference signals obtained from the chrominance channel. This causes the kinescope to operate according to the magnitude of the internally matrixed color signals (R, G and B). Certain other prior art receivers perform matrixing prior to the kinescope and in turn apply the color signals directly to appropriate electrodes of the kinescope. There are many types of matrixing amplifiers and techniques which can be conveniently used to perform these functions. In utilizing such matrixing techniques prior to the kinescope, one has to take care in controlling the biasing and operating conditions of these amplifiers. With this problem in mind, the luminance channel and receiver operation in general further has to provide the necessary retrace blanking conditions for presenting an adequate display. Horizontal and vertical retrace blanking, in many prior art receivers, was accomplished by effecting the luminance channel which, as mentioned above, is direct coupled to appropriate control electrodes of the kinescope. These blanking techniques serve to cut off the kinescope via the luminance channel. In an amplifying arrangement adapted to perform matrixing prior to the kinescope, there must also be adequate provisions for introducing these blanking signals.

It is therefore an object of the present invention to provide improved matrixing amplifier for use in a color television receiver.

A further object is to provide a matrixing amplifier with an improved biasing technique for driving a color kinescope.

A further object is to provide an improved video amplifier arrangement for luminance amplification while further serving to provide for the blanking functions.

These and other objects of the present invention are accomplished in one embodiment thereof by employing a bias transistor having a base, collector and emitter electrode, the emitter electrode is returned to a point of operating potential. The collector electrode of the transistor is coupled to a common terminal of an amplifier to be biased. The transistor conduction determines the amount of current that can flow through the amplifier.

A unidirectional current conducting device is coupled between the base electrode of the transistor and the output terminal of the amplifier and is repetitively caused to conduct by a signal applied thereto. The amount of conduction, determined by the voltage on the output electrode of the amplifier, determines the charge on a capacitor connected between the collector and base electrodes of the transistor. This capacitor maintains and controls the transistor conduction during the absence of the signal to therefore regulate the output voltage of the amplifier by controlling the current therethrough.

A further transistor video amplifier employs coupling from a collector load potentiometer to an emitter common terminal. The variable arm of the potentiometer is coupled to a peaking capacitor and is further coupled to the emitter electrode through selective networks. At one setting of the potentiometer maximum peaking is obtained by an AC ground provided for the selective networks, and at a second setting the capacitor shunts the collector to depeak the response.

Various other techniques include a contrast control in the emitter circuit which serves to change the gain of the transistor amplifier while maintaining constant peaking. This is afforded by using a bypass capacitor for increasing gain while further serving to introduce a second resonant circuit in shunt with a first circuit via the same capacitor.

These and other objects of the present invention will be described if reference is made to the following specification when read in conjunction with the accompanying sole FIGURE which is a schematic diagram partially in block and circuit form of a television receiver including embodiments according to this invention.

Television antenna 10 which is responsive to a transmitted television signal is coupled to the input of a tuner and an intermediate frequency (IF) amplifier 11. Section 11 supplies a video signal to a video detector and amplifier section 12. An output of section 12 is coupled to the sync, AGC and deflection circuitry 15 and to the chrominance amplifier 16. The output terminal of the chrominance amplifier 16 is coupled to a burst separator circuit 17. The burst separator circuit 17 is keyed on during that portion of the horizontal interval containing the color burst signal. The output terminal of the burst separator 17 is coupled to a color oscillator 18 which provides a continuous wave output signal synchronized to the transmitted burst. An output of the chrominance amplifier 16 is also coupled to the input of suitable color or chrominance demodulators 19. Such demodulators 19 serve to demodulate the chrominance signals, as applied thereto via the chrominance amplifier 16, with respect to the phase and frequency of the locked oscillator reference signal. The outputs from demodulator 19 are conventionally called the color difference signals and are labeled R–Y, B–Y and G–Y respectively. It is these color difference signals that are usually applied directly to the grid electrode of the kinescope 20 as employed in prior art techniques. In such prior art circuits the kinescope 20 serves to matrix the color difference signals applied to its grids with the luminance of Y signal applied to its cathode. The above-described matrixing effect is obtained herein by use of the amplifier configurations to be described. Accordingly, an output of the video detector and amplifier module 12 is applied to the base electrode of a transistor 21 via a suitable impedance network. The impedance network comprises a resistor 22 in series with an inductor 23 and a delay line 24. Delay line 24 is necessary to delay the luminance components so that they arrive at the matrixing amplifiers at the same time as the chrominance components. The delay line 24 is coupled to the base electrode of transistor 21 via resistor 25. Coupled to the junction between resistor 25 and delay line 24 is a biasing network for transistor 21. This biasing network comprises inductor 26 having a terminal coupled to the junction between resistors 27 and 28. The resistors 27 and 28 form a voltage divider between the $+V_C$ supply and reference potential. The emitter electrode of transistor 21 is coupled to the point of reference potential via resistor 30 in shunt with a high-frequency compensating capacitor 31. The collector electrode of transistor 21 is coupled to the $+V_C$ supply via a potentiometer 33. The variable tap of potentiometer 33 is coupled to a point of reference potential for AC signals via a capacitor 36. The junction 35 between the variable arm of potentiometer 33 and capacitor 36 is coupled back to the emitter electrode of transistor 21 through a video peaking network 38 including a contrast control 43. The peaking network 38 appears between the collector and emitter electrodes of transistor 21 and its operation will be described subsequently.

Briefly, the emitter electrode of transistor 21 is coupled to the aforementioned junction 35 via a first selective series network comprising the series combination of inductor 40, resistor 41 and capacitor 42. A contrast control network includes the series combination of variable resistor 43 in series with resistor 44 between the emitter electrode of transistor 21 and the point of reference potential. The variable tap of resistor 43 is coupled to one terminal of a bypass capacitor 45 having its other terminal coupled to the junction 47 between resistors 43 and 44. Junction 47 is also coupled to a second series selective network comprising capacitor 50, resistor 51 and inductor 52. This network is coupled between junction 47 and junction 35 and is shunted by a capacitor 53. The operation of the above-described peaking and contrast network 38 will be described subsequently.

The amplifying arrangement including transistor 21, as described above, also serves to accommodate the blanking functions of the receiver. In this manner a horizontal blanking pulse derived from the sync, AGC and deflection circuitry 15 is applied to the collector electrode of transistor 21 via the resistor 55 in series with diode 56. The diode 56 has the cathode coupled to the collector electrode of transistor 21. Vertical blanking is accommodated by applying a vertical wave shape, also derived from circuitry 15, to the collector electrode of transistor 21 via resistor 58 in series with capacitor 60 and diode 62. The diode 62 has its cathode electrode coupled to the collector electrode of transistor 21. The anode electrode of diode 62 as coupled to capacitor 60 is also coupled to the $+V_C$ supply via resistor 63. The junction formed by the connection of the cathode of diode 62 to the collector electrode of transistor 21 is coupled to the $+V_C$ supply through still another diode 64. Diode 64 thus appears in shunt with variable resistor 33 and has its cathode electrode coupled to the $+V_C$ supply and its anode electrode coupled to the collector electrode of transistor 21. The collector electrode of transistor 21 is further returned to the point of reference potential through the series network including inductor 65 and capacitor 66. The above-described transistor 21 amplifier stage serves to perform luminance amplification, horizontal and vertical blanking, contrast control and video peaking for the entire luminance amplifier chain.

The amplified video signal is applied to the base electrode of an emitter follower transistor 70 via a capacitor 71 coupled between the collector electrode of transistor 21 and the base electrode of transistor 70. Transistor 70 is shown as a PNP device and has its collector electrode coupled to the point of reference potential. The base biasing network comprises the voltage divider including resistors 72 and 73 coupled in series between the $+V_C$ supply and the point of reference potential. The junction between resistors 72 and 73 is coupled to the base electrode of transistor 70. The base electrode of transistor 70 is also coupled to the anode of a semiconductor diode 75. Diode 75 has its cathode bypassed for AC signals via capacitor 76 coupled between said cathode and the point of reference potential. A voltage divider includes the series combination of resistors 77, 78 and 79 connected between the $+V_C$ supply and the point of reference potential. The cathode of diode 75 is further coupled to the variable arm of resistor 78 to provide a brightness control for the luminance amplifier. The emitter electrode of the follower transistor 70 is also coupled to the emitter electrodes of three separate NPN transistors 80, 81 and 82. This applies the luminance signal via the separate drive adjust circuits to the emitter electrodes of the three NPN transistors 80, 81 and 82. Each drive adjust circuit includes a variable resistor 83, 84 and 85 respectively which is in shunt with a respective series RC network.

For example, the variable resistor 83 coupled between the emitter electrode of transistor 80 and the emitter electrode of transistor 70 is shunted by the RC network comprising the series combination of resistor 86 and capacitor 87.

In a similar manner resistor 84 associated with transistor 81 is shunted by the series combination of resistor 88 and capacitor 89. Resistor 85 associated with transistor 82 is shunted by resistor 90 in series with capacitor 92.

In summation, the above-described configuration comprises the three mentioned NPN transistors 80, 81 and 82 having their emitter electrodes coupled together via the above-described impedance networks and returned to ground through the emitter to collector path of the luminance drive transistor 70. The respective collector electrodes of the transistors 80, 81 and 82 are separately returned to the B+ supply respectively via the load resistors 94, 95 and 96.

The base electrodes of transistors 80, 81 and 82 are respectively coupled to the outputs of the color demodulator circuits 19. Accordingly, the R–Y color difference signal is applied to the base electrode of transistor 80, the B–Y to the base electrode of transistor 81, and the G–Y to the base electrode of transistor 82. Thus the above-noted transistors 80, 81 and 82 are driven at their emitter electrodes by the luminance or Y signal and at their base electrode by the appropriate color difference signal. These transistors 80, 81 and 82 therefore provide at their collector electrodes the color signals as the red, green and blue for application directly to the cathode electrodes of the kinescope 20. The grid electrodes of the kinescope 20 are returned to a biasing control network 100 which serves to maintain these electrodes at a suitable operating potential with respect to the quiescent voltage applied to the cathode electrodes of kinescope 20. This cathode voltage is due to the direct coupling of such electrodes to the respective collector electrodes of transistors 80, 81 and 82.

The matrixing amplifier configuration thus far described has many advantages in that it eliminates the separate drive amplifiers for the grids and cathodes as conventionally found in the prior art kinescope matrixing type circuit. Similar amplifier configurations are further described in detail if reference is made to a copending application assigned to the same assignee as herein and entitled, "Matrix Amplifiers for Matrixing Wide Band Signals with Narrow Band Signals," by John J. O'Toole, Ser. No. 693,361, filed on Dec. 26, 1967. The matrixing aspects of the configuration as indicated and the associated advantages are discussed in detail therein. In any event, the type of matrixing performed by the amplifier shown in the FIGURE is based on relatively low level signals as applied to the respective base and emitter electrodes of the transistors 80, 81 and 82.

OPERATION OF THE MATRIX AMPLIFIERS

For purposes of explaining the operation of the kinescope matrix and driver amplifier, reference is made to transistor 80. It is understood that the operation to be described is also applicable to the amplifiers including transistor 81 and 82.

The base electrode of transistor 80, as indicated, is coupled to the R–Y output of the color demodulators 19. The demodulator output connection serves to impress a positive operating level on the base electrode, which may, for example, be five volts (+5 volts). The emitter electrode of transistor 80, as indicated, is direct coupled to the emitter electrode of the follower transistor 70 which applies the luminance signal thereto. The luminance signal as applied has the positive retrace blanking pulses, both horizontal and vertical, added due to the operation of the video amplifier circuit including transistor 21, which will be described subsequently.

With the color difference signals applied to the base electrode of transistor 80 and the luminance and blanking signal applied to the emitter electrode of transistor 80, the luminance gain at the collector electrode is approximately determined by the ratio of resistor 94 to resistor 83. The transistor 80 being responsive to both the color difference signal and the luminance signal provides at its collector electrode a color signal which is then applied to the cathode of the kinescope. The resistor 83, as shown, is variable and serves to control the relative gain of each output circuit. The series combination of resistor 86 and capacitor 87 in shunt with resistor 83 serves to provide video peaking for the higher frequency components of the matrix signals. As indicated, the signal levels as applied to the transistor amplifier 80 to enable the same to perform matrixing are relatively low. It is therefore important, for such low level matrix operation, that the bias stability of the circuit be maintained relatively constant. Therefore, associated with the above-described amplifier configuration is a bias circuit comprising a transistor 103 having its emitter electrode coupled to a point of reference potential. The collector electrode of transistor 103 is returned to the emitter electrode of transistor 80 via a resistor 101. Coupled between the collector electrode and the base electrode of transistor 103 is a capacitor 102. The base electrode is further returned to the B+ operating supply via the series combination of resistors 104 and 105. The junction between resistors 104 and 105 is coupled to the collector electrode of transistor 80 via a diode 107 having its cathode coupled to said collector electrode, and its anode to said junction. Also coupled to the anode of diode 107 is one terminal of a capacitor 110 having its other terminal coupled to a source of positive pulses derived from the sync, AGC and deflection circuitry 15. The pulse occurs during the horizontal retrace interval and has a frequency determined according to the horizontal repetition rate. It is also noted that identical biasing circuits are also included and used for stabilizing the operation of transistors 81 and 82 associated with the blue and green cathodes of the kinescope 20.

The operation of the biasing circuit is as follows. The capacitor 102 and the internal capacitance between the base and collector electrodes of transistor 103 constitutes a large capacitance value due to the multiplication obtained by the Miller effect during conduction of transistor 103. This large capacitance serves to filter or bypass all AC signals from the electrodes of transistor 103 and to further act as a "current" source for biasing of transistor 103. Essentially the collector electrode of transistor 103 serves as a voltage source having a value which is determined by transistor conduction and base biasing. The base electrode of transistor 103 is biased in the forward direction by the series combination of resistors 104 and 105. Therefore, the voltage at the collector electrode of transistor 103 is also a function of the DC component at the junction of resistors 104 and 105 as determining the base voltage. A horizontal pulse of a magnitude slightly less than B+ is applied to the base electrode of transistor 103 via capacitor 110. This pulse also is applied through capacitor 110 to the anode of diode 107. The positive horizontal pulse will forward bias diode 107 during its positive transition to cause the voltage at the junction between resistors 104 and 105 to be clamped to the voltage at the collector electrode of transistor 80.

For example, assume that the horizontal pulse as applied to capacitor 110 is approximately 180 volts peak to peak and is relatively square or rectangular pulse waveform. Due to the duty cycle which is determined by the horizontal repetition rate and the pulse width, the average value of such a pulse is 150 volts below the peak positive portion. Thus, when the diode 107 is caused to conduct, the DC voltage at the anode thereof will be clamped to approximately the voltage at the collector electrode of transistor 80 minus the 150 volts. This difference is the voltage that provides the base current to transistor 103 via resistor 104.

Now assume that the voltage at the collector electrode of transistor 80 is greater than 150 volts. In this case the DC voltage at the anode of diode 107 will be greater than zero, because the above-mentioned difference will be positive. This serves to turn on transistor 103 enabling it to draw additional current through the emitter circuit of transistor 80. The additional emitter current causes a drop in collector voltage of transistor 80 and hence serves to maintain the collector voltage at a value close to the +150 volts.

On the other hand, if the collector voltage of transistor 80 is less than 150 volts, then the DC voltage at the anode of the diode will be negative. This action serves to reduce conduction of transistor 103, which therefore reduces the current drawn thereby via transistor 80. This action then serves to raise the collector potential of transistor 80 so that the collector electrode is maintained at, for example, the desired 150 volts. This stability afforded by the operation of the circuit is maintained irrespective of rather wide variations in circuit and component values and further including variations in applied operating potentials.

In operation the horizontal pulse is coupled through capacitor 110, which is selected to be large enough to apply the pulse to the anode of diode 107 without distorting the waveshape. When diode 107 conducts on the peak positive tip of the pulse, the capacitor 110 charges such that the DC voltage at the junction between capacitor 110 and diode 107 corresponds to the voltage at the collector electrode of transistor 80. Therefore, if the peak positive tip of the waveform is at the collector voltage, the DC voltage at the junction is 150 volts below this value. Capacitor 102 serves to bypass the horizontal waveshape pulse as applied via capacitor 110 and resistor 104 from the emitter of transistor 80. As transistor 103 is required to conduct more heavily to stabilize the collector voltage of transistor 80, the DC voltage across capacitor 102 decreases. During the line time or scan time the quiescent bias of transistor 80 is maintained at the above desired predetermined level by the action of capacitor 102. As indicated, capacitor 102 appearing between the collector and base electrodes of transistor 103, has its effective value multiplied by the Miller effect and therefore appears relatively large. Therefore, the voltage across the capacitor 102 is related to the difference between the actual collector voltage of transistor 80 as existing during the horizontal retrace interval and the desired voltage. During the scan time the capacitor 102 will charge at a rate determined partly by the magnitude of capacitor 102 and the magnitude of resistor 104. A portion of the charge current is directed through the base to emitter electrode of transistor 103, thus maintaining the transistor in conduction at a level partly determined in accordance with the voltage developed across capacitor 102. The above-mentioned time constant determines the sag of the quiescent operating point of transistor 80 during the line duration. That is to say that the voltage at the collector of transistor 80 during the beginning of the line will approximately be the above-mentioned 150 volts and it will decay at the end of the line to a value determined by the above-noted time constant. In summation, the above-described transistor biasing scheme is necessary to assure that the particular matrix amplifiers comprising the NPN transistors, as 80, having color difference signals applied to the base electrodes and driven at the emitter electrode by the PNP transistor 70 operates in a linear manner to thereby develop at their collector electrodes the desired matrix signals. An example of a circuit which operates successfully utilized the following components by way of example:

| | |
|---|---|
| Transistor 80 | 2N3440 |
| Transistor 103 | SE4021 |
| Resistor 83 | 110–150 ohms variable |
| Resistor 86 | 39 ohms |
| Resistor 94 | 10,000 ohms |
| Resistor 101 | 180 ohms |
| Resistor 104 | 220,000 ohms |
| Resistor 105 | 2,200,000 ohms |
| Capacitor 87 | 680 micromicrofarads |
| Capacitor 102 | 1.5 microfarads |
| Capacitor 110 | 0.01 microfarads |
| Diode 107 | FD222 |
| B+ | +220 volts |

The circuit operated with a horizontal pulse of approximately 180 volts peak to peak and a pulse duration of 12 microseconds. The rise time of the pulse was about 2 microseconds, with a fall time of about 2 microseconds.

OPERATION OF THE VIDEO AMPLIFIER INCLUDING TRANSISTOR 21

As indicated in the above-described operation for the kinescope driver matrix amplifier, the luminance signal as applied to the emitter electrode of transistor 80 contained horizontal and vertical retrace blanking.

To obtain such blanking a horizontal pulse is coupled to the collector electrode of transistor 21 via resistor 55 in series with the diode 56. A positive horizontal pulse as applied thereto forward biases the diode 56 and diode 64 causing the collector electrode of transistor 21 to go positive, or towards $+V_C$. This positive transition is coupled through capacitor 71 to the base electrode of transistor 70 causing the same to operate towards cutoff. The reverse biasing of transistor 70 in turn opens the ground return path of transistors 80, 81 and 82, respectively. This action causes current conduction to cease during the blanking pulse causing the collector electrodes of transistor 80 to 82 to go towards B+. This action in turn causes the cathode voltage of the kinescope 20 to go positive, thus cutting off or blanking the same.

During the vertical sync interval a positive vertical pulse is applied via resistor 58 and capacitor 60 to the anode of diode 62 causing diodes 62 and 64 to be forward biased. This action clamps the collector electrode of transistor 21 at the $+V_C$ level during the vertical blanking interval. This action, in turn, causes transistor 70 to go towards cutoff which action then raises the cathode potential of the kinescope 20 towards B+, thus again blanking the kinescope in a similar manner as described. It is also noted that due to the polarity of diodes 56 and 62, each diode is in turn reverse biased by the respective vertical and horizontal pulses to prevent intercoupling between the vertical and horizontal circuits. For example, during the pulse of the positive pulse forward biasing diode 62, the cathode of diode 56 also goes positive as it is connected to the collector electrode of transistor 21. This voltage transition to reverse bias diode 56, thus preventing any vertical signal from being applied to the horizontal circuit. The same action is provided by diode 62 when a horizontal pulse is being applied to the anode of diode 56, which in turn of course prevents horizontal pulses from being directed back to the vertical circuitry. Transistor 21 during the scan interval has the detected video signal applied to its base electrode via the above-described network including the delay line 24 and thus serves as a common emitter amplifier for the video signal. The collector electrode of transistor 21 is coupled to the load resistor 33 which is selected to provide adequate gain for the video signals. As indicated, the load resistor 33 is a potentiometer having its variable arm coupled to a terminal of a capacitor 36 whose other terminal is returned to the point of reference potential. With the variable arm of capacitor 36 at the top most position or that position where resistor 33 is coupled to the $+V_C$ supply, maximum peaking is provided. This is so as the emitter resistor 30 of transistor 21 in the above-described position as partly bypassed for high frequencies by capacitor 31 is now also bypassed by the additional series peaking network including inductor 40, capacitor 42 and resistor 41. In this position capacitor 36 has one terminal connected to ground as shown and terminal 35 connected to $+V_C$ which is, in essence, also an AC ground. Therefore, maximum selectivity is available, thus increasing the gain of transistor 21 at the resonant frequency of the above-described circuit. Similarly, during this top most position of the peaking control, the additional circuits including the contrast control 43 and the resonant circuit comprising inductor 52, capacitor 50, and resistor 51 are also operative to aid in bypassing the emitter electrode of transistor 21 for the higher frequency luminance components. Now assume that the potentiometer is moved to the opposite position corresponding to the collector electrode of transistor 21. At this position capacitor 36 appears between the collector electrode and ground, thus serving as a shunt capacitance to the collector electrode which action serves to reduce the frequency response of the amplifier 21 and therefore provides a depeaking action. At this position the full value of capacitor 36 also serves as the AC ground return for the above-described resonant circuits including, for example, inductors 40 and 52, capacitors 42 and 50, and resistors 41 and 51.

Thus the capacitor 36 as serving in this manner also would tend to raise the resonant frequency response of the above-described series tuned circuits. However, due to the substantial shunting of the collector electrode by the capacitor, the above-described depeaking predominates. This is so as the attempt to provide peaking in the emitter electrode of the transistor 21 by raising the resonant frequency of the selective series networks included therein is relatively ineffective, as the collector load in combination with the shunt capacitor 36 primarily determines the upper response point of the gain versus frequency characteristic.

The service switch 110 is shown in a closed position and as such completes the coupling of the emitter electrode of the luminance follower transistor 70 to the emitter electrodes of the NPN transistors 80 to 81.

In the dashed line position luminance drive is removed and the vertical deflection circuit included in section 15 is disabled. This collapses the raster. Removing the coupling of the emitter electrode of transistor 70 from transistors 80 to 81 also serves to remove blanking as accomplished in the first video amplifier 21.

Blanking in this position is afforded by the horizontal pulse coupled to the collector electrodes of transistors 80, 82, and 81 and described above during the description of the biasing operation.

OPERATION OF THE CONTRAST CONTROL ASSOCIATED WITH THE VIDEO AMPLIFIER TRANSISTOR 21

The function of a contrast control, in general, is to selectively increase the AC Gain of the video amplifier stage. Certain prior art contrasts controls operated by bypassing a degenerating resistor in the emitter or cathode circuit of an amplifier, the bypassed position thus afforded full gain for the amplifier. If high frequency peaking circuitry were utilized in the cathode as well, the contrast control would also serve to bypass such circuits and, in essence, eliminated high frequency peaking for full contrast operation. In the circuit shown the contrast control 43 is connected at one end thereof to the emitter electrode of transistor 21 and is returned to a point of reference potential via the resistor 44. Coupled to the junction of resistors 43 and 44 is the aforementioned series resonant circuit including inductor 52, capacitor 50 and resistor 51 in shunt with capacitor 53. The junction 47 is coupled to the adjustable arm of the contrast control 43 via a relatively large capacitor 45, thus forming a bypass for the control 43. As capacitor 45 is moved towards the emitter electrode of transistor 21, it serves to bypass resistor 43 for AC signals, thus eliminating the degeneration otherwise afforded by this resistor. For this position of capacitor 45 the series resonant circuit including inductor 40, resistor 41 and capacitor 42 is placed in parallel with the aforementioned series network including inductor 52 and capacitor 50. This is so as the reactance of the bypassed capacitor 45 is very small for all luminance signals. Placing the two series resonant circuits in parallel for the positioning of capacitor 45 closer to the emitter electrode of transistor 21 causes the peaking at high frequencies to follow the setting of the contrast control 43. For example, in the absence of the series resonant circuit including capacitor 50 and inductor 52, as one moves the contrast control towards maximum contrast position at the emitter electrode of transistor 21, the large value capacitor 45 would serve to bypass and virtually eliminate the effect of all emitter peaking circuitry associated with the amplifier. The increase in AC gain afforded by this contrast position would also be accompanied by a reduction in bandwidth as the gain bandwidth factor of an amplifier remains constant. So, at the increased gain position, the bandwidth would be reduced and the peaking would also be eliminated. The elimination of peaking would serve to effect the response of the display as concerning its ability to produce transitions from black to white or vice versa. In the circuit shown, as the contrast control is moved towards the emitter electrode of transistor 21 corresponding to maximum contrast, the additional peaking network including inductor 52 and capacitor 50 appears in parallel with the aforementioned peaking network. The dual effect serves to preserve the high frequency peaking available at the emitter electrode for this maximum contrast position. Alternatively, as the contrast control is moved to the minimum position where capacitor 45 has both terminals at junction 47 the resistor 43 serves to isolate the series network including capacitor 50 from the series network including capacitor 42. Thus peaking is primarily afforded by the series network including capacitor 42 and under the control of the above-described collector load and peaking potentiometer 33. It is noted that the above peaking compensation available with contrast control adjustment is independent of the setting of the peaking control 33. What is meant is that for any position of the peaking control 33, as described above, an adjustment of the contrast control 43 serves to retain that peaking afforded by that setting of resistor 33. This is because of the contrast tracking afforded by the two series resonant circuits coupled on either side of the contrast control via capacitor 45.

What is claimed is:

1. Apparatus for stabilizing the biasing point of an amplifier circuit having an input, output and common electrode and having the common electrode returned to a point of reference potential via an impedance, comprising,
   a. a bias transistor having a base, emitter and collector electrode, and having said collector electrode coupled to said common electrode of said amplifier, and having said emitter electrode coupled to a point of reference potential, whereby conduction of said transistor determines current flow through said amplifier,
   b. a unidirectional current conducting device having first and second terminals, said first terminal being coupled to said output electrode of said amplifier, and said second terminal being coupled to said base electrode of said transistor,
   c. a first capacitor coupled between the base and collector electrodes of said transistor and having a larger effective value when said transistor is conducting,
   d. means including a second capacitor for applying a repetitive signal to said second terminal of said unidirectional device and of a polarity in a direction to cause both said device and said transistor to conduct, said device conducting in accordance with the potential on said output electrode of said amplifier, to cause said second capacitor to charge to a level determined by said conduction, said voltage on said second capacitor determining the voltage across said first capacitor, said first capacitor serving to maintain conduction of said transistor relatively constant to cause said transistor to direct current from said amplifier via said common electrode to maintain said output electrode at a relatively fixed voltage level.

2. The apparatus according to claim 1 wherein said amplifier circuit comprises first and second transistors of opposite conductivity having their emitter electrodes coupled together, said first transistor being of the same conductivity as said bias transistor, and having a collector output terminal, a common emitter terminal, and a base input terminal, said second transistor being said impedance via said collector electrode of said second transistor being coupled to a point of reference potential.

3. The apparatus according to claim 1 wherein said repetitive signal is at the horizontal repetition rate of a standard television signal.

4. In an electrical circuit for matrixing a color difference signal occupying a first band of frequencies with a luminance signal occupying a second wider band of frequencies for providing a color signal, said circuit including first and second transistors of opposite conductivity each having a base, collector and emitter electrode, first means for coupling the emitter electrode of the first transistor to the emitter electrode of the second transistor, second means for applying a color difference signal to the base electrode of said first transistor and a luminance signal to the base electrode of said second transistor, second means for applying a color difference signal to the base electrode of said first transistor and a luminance signal to the base electrode of said second transistor, in combination therewith apparatus for stabilizing the quiescent operating point of said circuit comprising,
   a. a third transistor of the same conductivity as said first transistor having a base, collector and emitter electrode, said third transistor having the collector electrode thereof coupled to the emitter electrode of said first transistor and the emitter electrode coupled to a point of reference potential, whereby the conduction of said third transistor determines emitter current flow and therefore current flow in said first transistor,
   b. a first capacitor coupled between the collector and base electrodes of said third transistor,
   c. a unidirectional current conducting device having first and second terminals, and having said first terminal coupled to the collector electrode of said first transistor and said second terminal coupled to the base electrode of said third transistor,
   d. means including a second capacitor coupled to said second terminal of said unidirectional current conducting device for applying a repetitive signal thereto and of a polarity to forward bias both said third transistor and said unidirectional device in accordance with the potential at the collector electrode of said first transistor, to cause said first capacitor to develop a charge thereacross of a magnitude capable of maintaining said first transistor biased at a predetermined level, by causing said third transistor to conduct to thereby determine the current that flows through said first transistor.

5. A biased, stabilized matrix amplifier comprising, in combination,
   a. first and second transistors of opposite conductivity each having a base, collector and emitter electrode,
   b. first means for coupling said emitter electrode of said first transistor to the emitter electrode of said second transistor, said collector electrode of said second transistor being returned to a point of reference potential,
   c. means for applying a color difference signal to the base electrode of said first transistor,
   d. means for applying a luminance signal to the base electrode of said second transistor,
   e. load impedance means coupled to the collector electrode of said first transistor for providing thereacross a matrixed color signal,
   f. a third transistor having a base, collector and emitter electrode, and having the emitter electrode coupled to the point of reference potential,
   g. means coupling said collector electrode of said third transistor to said emitter electrode of said first transistor to control current flow through said first transistor in accordance with the conduction of said third transistor,
   h. a unidirectional current conducting device coupled between the collector output electrode of said first transistor and the base electrode of said third transistor,
   i. a first capacitor coupled between the base and collector electrodes of said third transistor,
   j. means including a second capacitor coupled to said unidirectional device for applying a signal thereto of a polarity to forward bias the same, said device conducting according to said potential at said collector electrode of said first transistor, to charge said first capacitor to a level determined by the average potential of said signal and said collector potential of said first transistor, the value of said first capacitor being sufficient to maintain said third transistor conducting to cause said collector potential of said first transistor to remain relatively constant whereby said current through said first transistor is therefore stabilized.

* * * * *

UNITED STATES PATENT OFFICE
CERTIFICATE OF CORRECTION

Patent No. 3,619,488 Dated November 9, 1971

Inventor(s) Donald Henry Willis

It is certified that error appears in the above-identified patent and that said Letters Patent are hereby corrected as shown below:

In the Abstract, line 12, that portion reading "conduct a" should read -- conduct by a --.

Column 2, line 32, that portion reading "luminance of Y" should read -- luminance or Y --.

Column 7, lines 15-16, that portion reading "transition to reverse" should read -- transition serves to reverse --.

Column 9, line 60, cancel beginning with "second means" to and including "said second transistor," in Column 9, line 62.

Signed and sealed this 18th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334